United States Patent [19]

Fulton et al.

[11] Patent Number: 4,620,272
[45] Date of Patent: Oct. 28, 1986

[54] LINE-REGENERATIVE MOTOR CONTROLLER WITH CURRENT LIMITER

[75] Inventors: Donald E. Fulton, Stoneham; Stanley P. Sassower, Natick, both of Mass.

[73] Assignee: IMEC Corporation, Boston, Mass.

[21] Appl. No.: 646,411

[22] Filed: Aug. 31, 1984

[51] Int. Cl.$^4$ ............................................. H01H 7/12
[52] U.S. Cl. ............................... 363/53; 318/762; 318/806; 363/37; 363/126
[58] Field of Search ............... 363/37, 52, 53, 89, 363/126, 127; 318/762, 803, 806, 808, 798

[56] References Cited

U.S. PATENT DOCUMENTS

| | | | |
|---|---|---|---|
| 4,272,807 | 6/1981 | Gallagher | 363/89 |
| 4,319,177 | 3/1982 | Kawada et al. | 318/803 |
| 4,353,023 | 10/1982 | Kawada et al. | 318/762 |
| 4,426,610 | 1/1984 | Kawada et al. | 318/798 |
| 4,434,393 | 2/1984 | Kobari et al. | 318/757 |
| 4,449,176 | 5/1984 | Turnbull | 363/126 |

FOREIGN PATENT DOCUMENTS

| | | | |
|---|---|---|---|
| 111922 | 9/1981 | Japan | 363/37 |
| 179180 | 10/1983 | Japan | 363/37 |
| 179168 | 10/1983 | Japan | 363/89 |
| 215977 | 12/1983 | Japan | 363/37 |

Primary Examiner—William M. Beha, Jr.
Attorney, Agent, or Firm—Quarles & Brady

[57] ABSTRACT

An AC motor drive includes a power converter which supplies current to a DC bus from three-phase power lines. An inverter drives the motor from power delivered to the DC bus and it regenerates power to the DC bus when the motor is decelerated. The power converter in turn regenerates the power to the power lines by controlling line current such that it is substantially in-phase with the applied line voltages. Current overload protection is provided for the transistor switches employed in the power converter bridge circuit.

5 Claims, 2 Drawing Figures

LINE-REGENERATIVE MOTOR CONTROLLER WITH CURRENT LIMITER

BACKGROUND OF THE INVENTION

The field of the invention is solid state power converters for use in regenerative motor controllers.

A motor controller converts the fixed-frequency AC power line voltage to a voltage and current suitable for driving the selected electric motor. An AC motor controller, for example, is commonly comprised of two sections: a power converter; and a motor inverter. The power converter connects to the line voltage and produces a controlled voltage on a DC bus which connects to the input of the motor inverter. The motor inverter generates an AC current for the motor which produces the desired motor speed and torque.

When motors are decelerated, they regenerate power. A motor inverter passes this regenerated power back to the DC bus where it is either dissipated by a resistor which is connected across the bus by a chopper circuit, or it is regenerated back to the power lines by the power converter. A number of regenerative power converters are known in the art, and as disclosed in U.S. Pat. No. 4,353,023 these typically employ silicon controlled rectifiers (SCR's) as the solid state control elements. These prior regenerative power converters feed a significant fraction of the regenerated power back into the power lines as reactive, or harmonic, power rather than real power. This results in a low power factor, which in turn, lowers the efficiency of the power converter and the motor drive. In addition, SCR converters are troublesome because SCR's are difficult to turn off once they are turned on and complex mode switching circuitry is required to accomodate changes in the direction of power flow.

SUMMARY OF THE INVENTION

The present invention relates to a regenerative power converter which employs solid state switches to conduct regenerated power back to the power lines. More particularly, a converter control circuit monitors the power line voltages and produces control signals for the solid state switches in the converter bridge circuit which sequentially turns them on in such a manner that regenerated current is applied in-phase to the power lines.

A general object of the invention is to provide an efficient power converter. This is accomplished in part by the fact that the power converter regenerates real power back to the power lines through the two phases of the power lines which have the maximum line-to-line voltage.

Another object of the invention is to provide a regenerative power converter which employs transistors or other solid state switching devices which are easily turned on and off. The converter control circuit of the present invention turns the solid state switches on and off to provide bidirectional power flow without the need for complex mode switching circuitry.

Another object of the invention is to protect the converter transistors from line transients or excess regenerated power transients by limiting the current flow without interrupting normal motor control operation. A current sensor monitors the magnitude of current flow in the DC bus toward the power lines, and when it exceeds a pre-established limit, the transistors are turned off for a short time interval. Input inductors prevent the line current from rapidly decaying, and a "bang-bang" current limiting action occurs.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
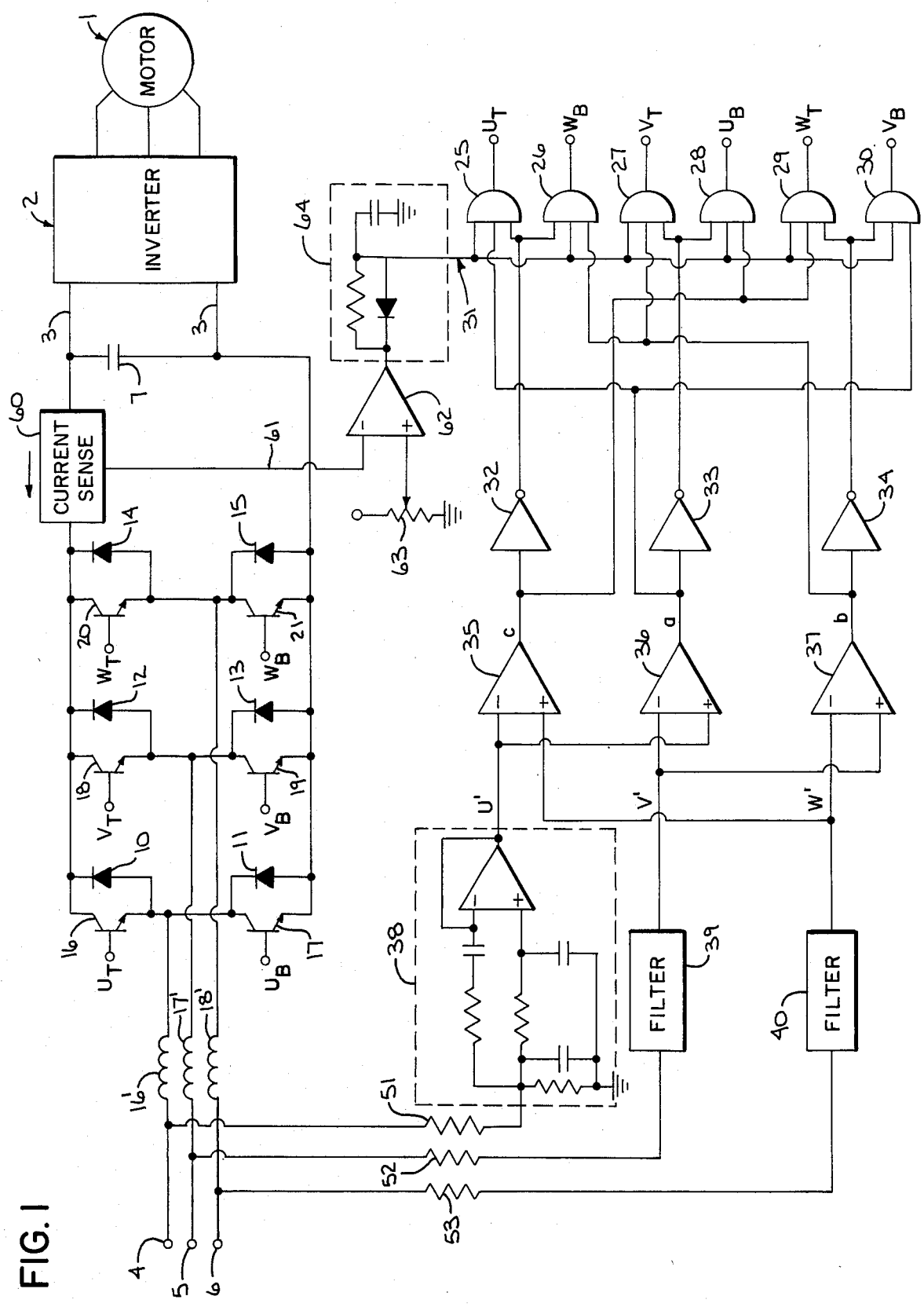
FIG. 1 is a schematic diagram of the preferred embodiment of the invented power converter which is employed in an AC motor drive system.

Referring particularly to FIG. 1, and AC motor drive system for a motor 1 includes an inverter circuit 2 which connects to a DC bus 3. The DC bus 3 provides a DC voltage and current which is supplied by the power converter of the present invention. The power converter has a set of three inputs 4, 5 and 6 which connect to three-phase power lines (not shown) and a pair of outputs which connect across a filter capacitor 7 and to the DC bus 3. The inverter 2 draws power from the DC bus 3 to drive the motor 1 at a commanded speed or at a desired torque. The inverter 2 may also decelerate the motor 1, in which case the power regenerated by the motor 1 is conveyed back to the DC bus 3 by the inverter 2. Such regeneration causes the DC bus voltage to rise.

The power converter circuit includes a set of six diodes 10-15 which are connected in a 3-phase bridge configuration. This diode bridge converts the 3-phase power applied to the input terminals 4-6 to a DC voltage which is applied to the bus 3. Three inductors 16', 17' and 18' serve to limit circulating current in the power converter, to prevent the voltage steps produced by the power converter during "bang-bang" current limiting from feeding back into the power lines 4-6, and to filter out voltage spikes on the power lines 4-6. The inductors 16'-18' may be constructed as a single three-phase inductor. Filter capacitor 7 smooths the voltage on the DC bus 3 and limits the interaction between the power converter and the inverter 2.

Connected in parallel with the respective diodes 10-15 are a set of NPN switching transistors 16-21. The switching transistors 16-21 also form a 3-phase bridge, but they are connected to conduct current in the opposite direction—that is, from the DC bus 3 back to the power lines 4-6. The base leads on the transistors 16-21 are controlled as will be described in detail below to switch the appropriate transistors on during each cycle of the power line voltage. When the DC bus voltage drops below the average rectified power line voltage current flow through the diodes 10-15 increases, and when the DC bus voltage rises above the average rectified power line voltage during regeneration, current flow through the transistor bridge to the power line terminals 4-6 increases.

The converter control circuit which operates the switching transistors 16-21 includes a set of six AND gates 25-30 which connect through isolated base drive circuits that drive the bases of the respective transistors 16, 21, 18, 17, 20 and 19. One input on each AND gate 25-30 is driven by a disable line 31, a second input is driven by the output of one of three inverter gates 32-34 and a third input is driven by one of three differential comparators 35-37. The comparators 35-37 are in turn driven by signals from three low-pass filter circuits 38-40 which connect to the respective power line terminals 4-6. The converter control circuit compares the line voltages and turns on the top transistor (16, 18 or 20) coupled to the power line with the highest voltage and turns on the bottom transistor (11, 13 or 15) coupled to the power line with the lowest voltage. This provides a good power factor for current which is conducted through the enabled transistors back to the power lines during regeneration.

The operation of the converter control circuit will now be described with reference to FIGS. 1 and 2. The three line voltage phases are applied to the low pass filters 38-40 through attenuating resistors 51, 52 and 53 where they are filtered to produce the three waveforms U', V' and W' shown in FIG. 2. The low pass filters 38-40 have a cut off frequency of 1 kHz which passes the 50 or 60 Hertz power line frequency with substantially little effect, but which significantly attenuates the 5 kHz to 10 kHz switching voltage that the power converter generates during the "bang-bang" current limiting. During "bang-bang" current limiting the input terminals of the power converter switch rapidly between the DC bus voltages. A fraction of that voltage appears at the power line terminals due to a voltage divider action between the power line inductive impedance and the impedance of inductors 16'-18'. The filters 38-40 prevent this switching from interfering with the normal phase sequencing of the power converter.

Figure 2:
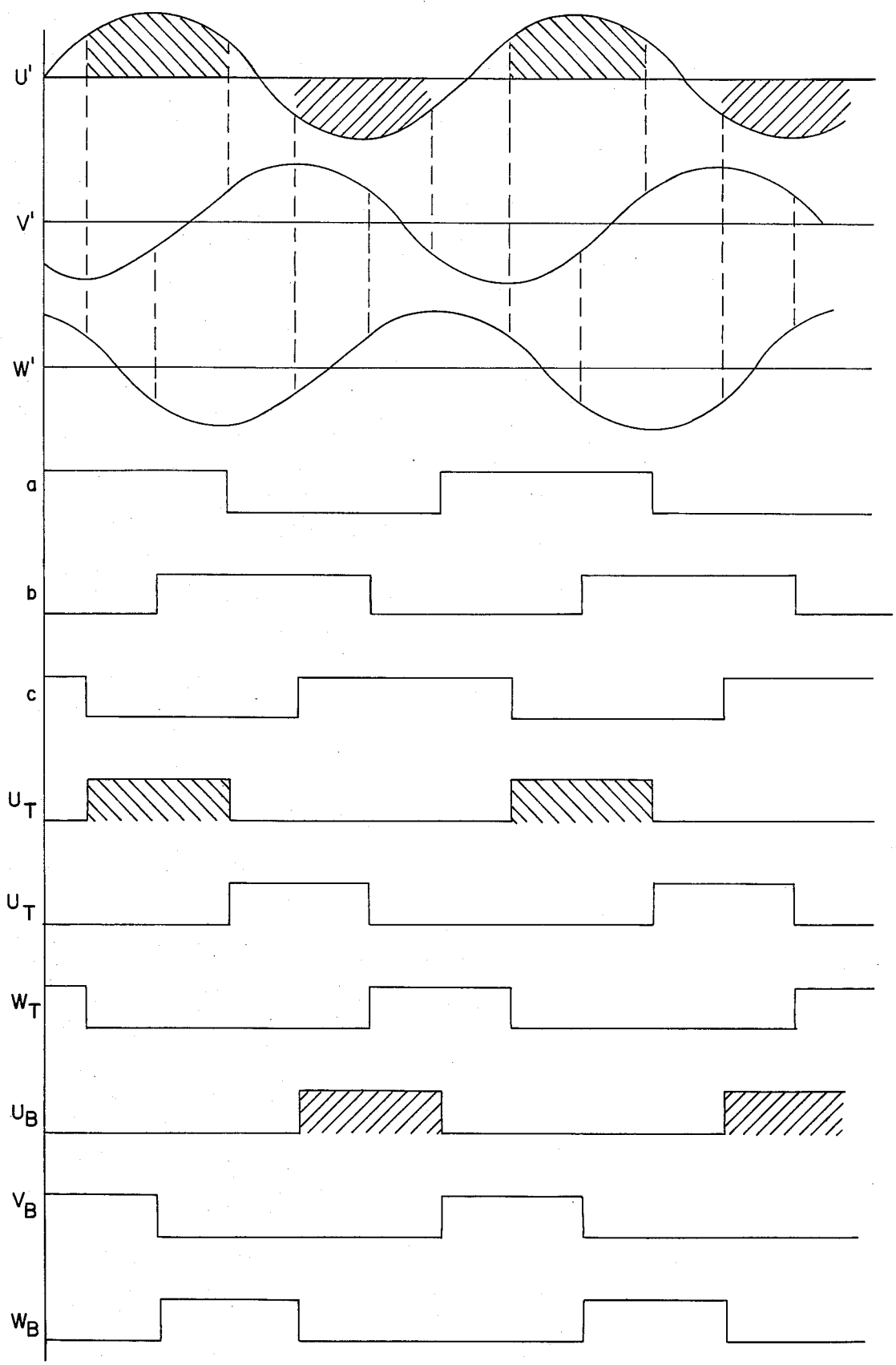
FIG. 2 is a timing diagram illustrating the signals which are produced in the circuit of FIG. 1.

The three waveforms U', V' and W' are compared in magnitude by the respective comparator circuits 35-37 which produce at their outputs the waveforms c, a and b shown in FIG. 2. The inversions of these waveforms c, a and b are produced by the inverter gates 32, 33 and 34 and all six signals are combined by the AND gates 25-30 to produce the six output signals $U_T$, $V_T$, $W_T$, $U_B$, $V_B$, and $W_B$.

As shown by the cross hatching in waveforms U', $U_T$ and $U_B$ in FIG. 2, the output signals which drive the switching transistors 16 and 17 are in-phase with the power line voltage at input terminal 4. Thus during regeneration, the transistor 16 is turned on by the control signal $U_T$ when the power line voltage at terminal 4 is at a maximum and the transistor 17 is turned on by the control signal $U_B$ when the signal is at a minimum. The other two legs of the bridge operate in the same manner with respect to the power line voltages on terminals 5 and 6 with the result that regenerated current is substantially in-phase with the three applied power line voltages.

The power converter described thus far is remarkably simple in construction and operation. If the DC bus voltage drops as a result of power being consumed by the motor 1, current flow through the diodes 10-15 increases to restore bus voltage. If the motor 1 and inverter 2 regenerate power, the DC bus voltage rises and the current flow through the switching transistors 16-21 will increase to limit the rise in the DC bus voltage and to regenerate substantially in-phase power to the power lines. Under conditions of no power flow from the DC bus a small current circulates continuously through the inductors 16'-18', the diodes 10-15 and the switching transistors 16-21. The converter is self-regulating and it requires no mode switching circuitry.

Because the power line voltage is quite variable, the preferred embodiment of the invention includes current limiting circuitry which protects the switching transistors 16-21 from momentary drop in power line voltage. The inductors 16-18 provide protection against short duration, high amplitude power line spikes. However, inductors of reasonable size cannot protect against half cycle voltage dips that occur when nearby motors or transformers are switched on. Accordingly, a current sense circuit 60 is connected to the DC bus 3 to monitor the current flowing from the DC bus 3 to the power lines. A Hall sensor is used for this purpose and it provides a current feedback signal on line 61 which is applied to the inverting input of a comparator circuit 62. A current reference voltage established by a potentiometer 63 is applied to the other input, and when the current feedback signals exceeds the reference voltage, the output of the comparator is driven to a logic low voltage. The comparator output connects through a time delay circuit 64 to the disable line 31, and when excessive current flow is sensed, the AND gates 25-30 are all disabled to prevent the transistors 16-21 from conducting current. The time delay circuit 64 holds the circuit in this disabled state for approximately 30 microseconds, after which the transistors are enabled again if the current level has dropped to an acceptable value.

The current limiting circuitry acts to limit the amount of average current that can be regenerated to the power lines. If the inverter 2 supplies more current to the DC bus 3 than the power converter can couple to the power lines, then the DC bus voltage will begin to rise as the capacitor 7 charges. To protect the system in this case, a bus overvoltage sense circuit (not shown in the drawings) is typically employed to control the motor inverter 2 in such a manner as to limit the current regenerated to the DC bus 3.

It should be apparent to those skilled in the art that variations are possible in the preferred embodiment of the invention described herein without departing from the scope of the invention. For example, other electronic switches such as GTO's may be emloyed in place of transistors, and numerous filter circuits, time delay circuits and current sense circuits are known to the art.

We claim:

1. A power converter for a motor control system, the combination comprising:
    a set of three inductors, each connected to respective ones of three power lines;
    a three-phase diode bridge having three legs, each leg being connected across a pair of output terminals, and each leg having a pair of series connected diodes with the juncture of each diode pair being connected to respective ones of the three inductors;
    a set of six solid state switches, each solid state switch being connected in parallel with respective ones of the diodes to conduct current in the opposite direction as the diode when a control signal is applied to a control terminal on the solid state switch;
    a DC bus connected to the output terminals of the three-phase diode bridge and coupled to a motor to provide current to the motor and to receive current from the motor during regeneration; and a converter control circuit having inputs connected to the power lines and including:
- (a) comparator means for determining which of the three power lines has the highest voltage at any moment in time and which of the three power lines has the lowest voltage at any moment in time,
- (b) gate means connected to the comparator means and being operable to produce control signals for the solid state switches which enable regenerated current to be conducted to the pair of power lines having the maximum line-to-line voltage at any moment in time, and
- (c) current limiting means coupled to the DC bus to sense the magnitude of the current flowing therein and coupled to the gate means to disable the production of said control signals when the magnitude of the sensed current exceeds a preselected limit, wherein the current limiting means includes a time delay circuit which disables the production of said control signals for a preselected time interval after the sensed current exceeds the preselected limit.

2. The power converter as recited in claim 1 in which the comparator means includes three comparator circuits which compare the magnitude of the voltages on successive pairs of power lines and which produce a first set of three logic signals having logic states indicative of which power line voltage in each compared pair is the larger.

3. The power converter as recited in claim 2 in which the gate means includes a set of six AND gates which connect to receive the three logic signals and which produce at their outputs the control signals for the solid state switches;

wherein at any moment in time one AND gate is enabled to produce a control signal which causes an electronic switch to conduct current to the power line having the highest voltage and a second AND gate is enabled to produce a control signal which causes another electronic switch to conduct current to the power line having the lowest voltage.

4. The power converter as recited in claim 1 in which a filter circuit is connected between each power line and said converter control circuit inputs.

5. The power converter as recited in claim 4 in which the filter circuits are low pass filters that provide substantially no attenuation of power line frequency voltages.

* * * * *